United States Patent Office 3,213,051
Patented Oct. 19, 1965

3,213,051
POLYVINYL ACETATE AND POLYVINYL
ALCOHOL ADHESIVES
Andrew E. Pink, Bainbridge, N.Y., now by change of name to Andrew Earl Pierce, assignor to The Borden Company, New York, N.Y., a corporation of New Jersey
No Drawing. Filed June 21, 1961, Ser. No. 118,517
6 Claims. (Cl. 260—29.6)

This invention relates to an aqueous emulsion of polyvinyl acetate containing boric acid and polyvinyl alcohol that is particularly useful as a quick setting adhesive.

Heretofore it has not been possible to incorporate functional amounts of boric acid into a solution of polyvinyl alcohol without causing instability of viscosity. If boric acid is added to polyvinyl acetate emulsion containing the alcohol as a protective colloid, for example, the stability of the emulsion is so reduced that the emulsion thickens excessively on ageing and finally gels.

I have now discovered a viscosity stabilizer and gelation retarding agent that, when introduced as a component of the emulsion, prevents the thickening and gelation on ageing, i.e., storage for 2 months or so, and, on the other hand, does not inhibit the development of strength of the adhesive film, even when wet, on the surfaces to be bonded.

For example, kraft paper was laminated with a polyvinyl acetate emulsion adhesive including a small percentage of polyvinyl alcohol on the weight of the polyvinyl acetate. The laminated product, after soaking in water for 16 hours and then being tested, showed separation of the plied layers, failure occurring in the adhesive. Another adhesive containing also 0.6% of boric acid for 3.5% of polyvinyl alcohol on the total weight of the emulsion but being otherwise comparable was unsatisfactory because of the excessive thickening and gelation which occur in storage of the emulsion. In another comparison with the same polyvinyl acetate emulsion containing the polyvinyl alcohol, there was admixed not only the boric acid but also ammonium thiocyanate in the amount of 3 parts. Now the viscosity stability of the adhesive on ageing in storage was entirely satisfactory and, after 16 hours' soaking of paper bonded therewith in water at room temperature, the strength of the adhesive bond exceeded that of the paper itself; on attempted separation of the bonded plies, the failures occurred in the paper fibers and not in the adhesive bond.

Briefly stated, the invention comprises the aqueous emulsions of kind described in which modification is effected by a water soluble gelation retarder.

As to materials, the polyvinyl acetate used is any commercial emulsion of the product of that name, e.g., any grade ordinarily used in making aqueous adhesive emulsions.

The polyvinyl alcohol (PVOH) used is also any commercial variety. It is the hydrolysis product of polyvinyl acetate (PVAc). I have used to advantage polyvinyl alcohol representing polyvinyl acetate that is hydrolyzed to the extent of about 76%–99% or over, although polyvinyl alcohol of lower or higher degree of hydrolysis may be used.

As the setting or tackifying accelerator, I know of no substitute for boric acid. This may be supplied as commercial or pure boric acid or as a compound which, in water, hydrolyzes and develops boric acid, as for instance any of the commercial alkyl esters of boric acid or a borate of strongly acidic nature, such as the borate of aluminum or other metal of low electropositivity, examples being titanium or zirconium.

The gelation (or tackifying) retarder that is recommended for commercial use is ammonium or sodium, potassium, lithium or other alkali metal thiocyanate. Another that may be used is urea although it is less effective as a retarder than the thiocyanates.

In addition to these essential components, we may also and ordinarily do include other conventional ingredients for their usual effects including the following: antifoaming agent, examples of which are tributyl citrate, pine oil, and dimethyl siloxane polymers; fillers as, for instance, kaolin, china or other non-swelling clay, and diatomaceous earth; water supplied largely by the aqueous emulsion in which the polyvinyl acetate is introduced but ordinarily increased in proportion by water added as such in the final compounding; a preservative that may be any one of the usual preservatives for polyvinyl acetate adhesives, as, for example, phenol, cresol, chlorophenol, and sodium salicylate; and advantageously also a usual volatile solvent for the polyvinyl acetate and a non-volatile solvent (plasticizer) for the polyvinyl acetate, examples of which plasticizers are diethyl, dibutyl, and dioctyl phthalate, diethylene glycol adipate in condensed condition, and tricresyl phosphate.

The following table shows the proportions of the essential components of the adhesive that are recommended and also a permissible range of proportions that is suitable for some uses of the adhesive. In this table and elsewhere herein proportions are expressed as parts by weight.

| | Parts by Weight | |
|---|---|---|
| | Recommended | Permissible |
| For 100 parts PVAc, dry basis: | | |
| Polyvinyl alcohol (PVOH) | 5–30 | 4–50 |
| Total water | 75–400 | 70–700 |
| For 100 parts PVOH: | | |
| Boric acid | 17–50 | 15–100 |
| Gelation retarding agent | 75–200 | 25–900 |

The proportion of the retarding agent should be not less in any event than 150% of the weight of the boric acid.

Proportions of the materials admixed to advantage for their usual effects are 0–100 parts and suitably 10–60 of filler, 0–0.5 and suitably 0.01–0.1 part of antifoamer, 0.4–1 part or more of preservative, 0–20 parts plasticizer and 0–75 parts and normally 0–40 of any one of the known volatile chlorinated hydrocarbon solvents for polyvinyl acetate, all for 100 parts of the polyvinyl acetate. The plasticizer is not necessary in the composition to impart water resistance in the adhesive film when the film includes the boric acid and the gelation or tackifying retarder in the amounts shown.

Additional water is incorporated in amount, if any, required to lower the viscosity of the finished adhesive emulsion to that selected for the application, so to about 500–4000 cps. and to dilute the adhesive to the extent that it will not become objectionably tacky during application. Ranges of proportion of total water are shown above.

Acid is added in amount if any required to lower the pH of the adhesive emulsion below 7, as for example within the range 2–6 and ordinarily about 3–5.5. Acids that are satisfactory and illustrate the class if any to be used are formic, acetic, propionic and the mineral acids such as hydrochloric and sulfuric acids, the latter when used being introduced in dilute aqueous solution.

So long as the pH is below that at which the boric acid is converted to a borate salt, with the extensive ionization characteristic of soluble salts such as borates, the pH is not the controlling factor in the stability and nongelling properties of the adhesive emulsion. I have found, for example, that polyvinyl alcohol solutions containing 2 parts of polyvinyl alcohol and 2 parts of boric acid do not gel when the solution contains also either 10 parts of ammonium thiocyanate (giving a pH of 5.4 for the whole solution) or 10 parts of urea (making the pH 6). When, however, the thiocyanate or the urea are replaced by 10 parts of either formamide or dicyandiamide with the pH again 6, then the solutions gel although the pH is the same as that with the urea composition and the chemical similarity of the formamide and the dicyandiamide to urea is close.

Once these results have been observed, various theories may be advanced to explain the mechanism by which the thiocyanate and the urea function. I consider that the retardant thiocyanate and urea functon alike in decreasing the accessibility of the polyvinyl alcohol to or its reactivity with the anion of boric acid, as by lyophylic action of the retarder is solvating the boric-acid-sensitive polyvinyl alcohol or by complexing the anion of boric acid which, it is noted, has a surplus of electrons which it can supply to the electron-deficient thiocyanate ion or nitrogen of the amide groups in urea. Whatever the exact explanation, the invention utilizes all of the effects of the retarding agent in preventing the usual thickening or gelling of polyvinyl alcohol compositions by boric acid admixed therewith while preserving the effectiveness of the boric acid in accelerating the setting of the whole polyvinyl acetate adhesive emulsion.

The invention will be further illustrated by description in connection with the following specific examples of the practice of it, the medium in which the polyvinyl acetate is emulsified being water.

Example 1

An adhesive composition of pH 4–5 was made of the Formula 1. It was compared with a "Control A" constituting no part of this invention.

| Component | Example 1 | Control A |
|---|---|---|
| Polyvinyl acetate emulsion (54% solids) | 49 | 49 |
| Polyvinyl alcohol (PVAc—98% hydrolyzed) | 2.3 | 2.3 |
| Water, additional | 30.87 | 34.47 |
| China clay | 6 | 6 |
| Methyl siloxane polymer (antifoamer) | 0.03 | 0.03 |
| Phenol (preservative) | 0.2 | 0.2 |
| Ammonium thiocyanate | 3 | |
| Urea | | |
| Boric acid | 0.6 | |
| Water | 4 | 4 |
| Trichloroethylene | 4 | 4 |
| Total | 100 | 100 |

In compounding, the polyvinyl alcohol was dispersed in water along with the preservative and antifoamer, the mixture warmed to 190° F. until solution was complete, then cooled to below 140° F., and added in the cooled condition to the emulsion of polyvinyl acetate. The ammonium thiocyanate, boric acid and more water were mixed and heated to 120° F. until solution was effected. This solution was then added at 120° F. to the emulsified mixture first made of the other components, with rapid agitation. The trichloroethylene was added last and emulsified by stirring.

Setting speeds of these adhesives was compared specifically by measuring the force in lbs./sq. in. required to separate two pieces of kraft paper (60 lb. basis weight) adhered over an area 1 inch square with a uniform spread of glue.

| Setting Period | Example 1 | Control |
|---|---|---|
| 2 seconds pounds | 0.67 | 0.58 |
| 5 seconds do | 1.10 | 0.63 |

Further testing was done to compare the water resistance of kraft paper glued with these adhesives as follows: A wet film .0015 x ½ inch was deposited on one surface of the paper which was then immediately covered with another sheet. The assembly was allowed to dry with a 2–3 lb. weight on the sealed area for 15–20 min. The seal was then allowed to condition for about 16 hours at room temperature and then immersed in water at room temperature for 16 hours. Pulling apart results follow.

Example 1 seals:          Control seals
   100% fiber tear _____ 0% fiber tear.
   Film does not redisperse _____ Film redisperses.

Example 2

The procedure and the composition of Example 1 were used except that the 3 parts of ammonium thiocyanate were replaced by 4 parts of urea (Example 2). A control preparation (B) that is no part of the invention was made in identical manner but with only 0.5 part of urea.

Both Example 2 and B emulsions showed 100% fiber tear in the pulling apart tests of kraft paper strips bonded therewith. Also the bonding films did not redisperse in the water soaking test described in Example 1. However this proportion of the urea in Control B was inadequate to give the viscosity stability to which the present invention is directed. Thus after 8 weeks' ageing the viscosity of Control B had increased from 1,000 cps. initially up to 16,200. The emulsion of Example 1, on the other hand, increased only from 1,070 cps. at the start up to about 1,700 in 9 weeks and the Example 2 emulsion was nearly but not quite as stable in viscosity as Example 1.

The setting speed and strength tests, made as in Example 1, showed for Example 2 after 2 seconds 0.55 lb. and after 5 seconds 0.95 lb./sq. in.

Example 3

The procedure and composition of Example 1 are used with the omission of the said minor components and those giving only the conventional effect, the whole adhesive emulsion being of the formula:

| Component: | Parts by weight |
|---|---|
| Polyvinyl acetate emulsion (54%) | 49 |
| Polyvinyl alcohol (PVAc—98% hydrolyzed) | 2.3 |
| Water, additional | 30.87 |
| Ammonium thiocyanate | 3 |
| Boric acid | 0.6 |

The emulsion so made is satisfactory in viscosity stability, non-gelling property and speed of setting in film form.

Example 4

The procedure and composition of Example 1 are used except that the ammonium thiocyanate there used is replaced by an equal weight of each of the following retarders, used separately and in turn: sodium, potassium and lithium thiocyanates.

Example 5

The procedure and composition of Example 1 are used except that the polyvinyl alcohol is introduced in the form of polyvinyl acetate hydrolyzed to the extent of 76%.

In general, the adhesives made as described and illustrated in the examples do not depend substantially on absorption of water into porous products, such as paper being bonded, for development of wet tack. They are tacky in film form while wet yet are well suited for use on high speed roll applicators.

While a proportion of ammonium thiocyanate in the lower part of the ranges stated is adequate to stabilize polyvinyl acetate emulsions against premature setting, an increased proportion of ammonium thiocyanate promotes development of the desired long strings of adhesive as the surfaces, with the adhesive in partially set condition therebetween, are separated.

In a control sample, the ammonium thiocyanate was introduced but the boric acid was omitted. The desired quickness of set or tack development was not realized.

When the polyvinyl acetate was omitted in another control, the wet tack or grab (stickiness) property was not realized and slipperiness of the adhesive was noted.

It will be understood that it is intended to cover all changes and modifications of the examples of the invention herein chosen for the purpose of illustration which do not constitute departures from the spirit and scope of the invention.

I claim:

1. An adhesive emulsion characterized by developing tackiness in film form while wet and being non-gelling on ageing, consisting essentially of an aqueous dispersion of polyvinyl acetate, polyvinyl alcohol, boric acid as setting agent for the adhesive, a retarder of premature gelation of the dispersion selected from the group consisting of alkali metal and ammonium thiocyanates and urea, the pH of the emulsion being approximately within the range 2–6 and the said retarder and boric acid being in the proportions by weight of 25–900 parts and 15–100 parts, respectively, for 100 parts of polyvinyl alcohol.

2. The adhesive of claim 1, the proportion of the polyvinyl alcohol being 4–50 parts by weight for about 100 parts of polyvinyl acetate on the dry basis.

3. The adhesive of claim 1, the retarding agent being an alkali metal thiocyanate.

4. The adhesive of claim 2, the retarding agent being ammonium thiocyanate.

5. The adhesive of claim 2, the retarding agent being urea.

6. The adhesive of claim 2, the proportion of water being about 70–700 parts for 100 parts of the polyvinyl acetate on the dry basis.

References Cited by the Examiner

UNITED STATES PATENTS

| 2,439,108 | 4/48 | Staehle | 260—29.6 |
| 2,809,949 | 10/57 | Orth | 260—29.6 |
| 3,030,258 | 4/62 | Wagner | 260—29.6 |

MURRAY TILLMAN, *Primary Examiner.*

LEON J. BERCOVITZ, *Examiner.*